(12) United States Patent
Feng

(10) Patent No.: US 6,483,523 B1
(45) Date of Patent: Nov. 19, 2002

(54) PERSONALIZED INTERFACE BROWSER AND ITS BROWSING METHOD

(75) Inventor: Ming-Whei Feng, Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 09/306,719

(22) Filed: May 7, 1999

(30) Foreign Application Priority Data

May 8, 1998 (TW) ......................................... 87107178

(51) Int. Cl.[7] ............................................... G06F 3/14
(52) U.S. Cl. ....................... 345/745; 345/744; 345/747; 345/762; 345/765; 709/203; 709/218; 709/219
(58) Field of Search ................................ 345/745, 747, 345/744, 762, 765, 811, 760, 968; 707/501.1, 10; 709/203, 218, 219

(56) References Cited

U.S. PATENT DOCUMENTS

| | | | | |
|---|---|---|---|---|
| 5,848,396 A | * | 12/1998 | Gerace | 705/10 |
| 5,890,152 A | * | 3/1999 | Rapaport et al. | 707/6 |
| 6,014,662 A | * | 1/2000 | Moran et al. | 707/3 |
| 6,076,166 A | * | 6/2000 | Moshfeghi et al. | 713/201 |
| 6,108,686 A | * | 8/2000 | Williams, Jr. | 709/202 |

OTHER PUBLICATIONS

Mark R. Browser NetScape 2.0 1996 pp. 117–121*

* cited by examiner

Primary Examiner—Kristine Kincaid
Assistant Examiner—Thomas T. Nguyen
(74) Attorney, Agent, or Firm—Troxell Law Office PLLC

(57) ABSTRACT

A personalized interface browser for browsing information of a data bank, which includes browser display means for displaying a browser interface for enabling the user to browse the information of the data bank, a set of browser interface models corresponding to predetermined types of users for defining the appearance and function of the browser interface displayed on the display means, and a personal profile for recording the type of user corresponding to the user who currently uses the personalized interface browser, wherein when the current user starting the browser display means to display the browser interface, a corresponding browser interface model is picked up from the predetermined browser interface models subject to the personal profile of the current user, for adjusting the appearance and function of the browser interface.

5 Claims, 4 Drawing Sheets

PERSONALIZED INTERFACE BROWSER AND ITS BROWSING METHOD

BACKGROUND OF THE INVENTION

The present invention relates to a personalized interface browser and its browsing method, and more particularly to such a personalized interface browser for internet and multimedia application which displays a personalized browser interface to fit the demands of different types of users.

Following the fast development of internet and multimedia application, for example, remote shopping, the requirement for the application of a browser has become more critical. In order to let the user obtain useful information efficiently and rapidly, a browser must be capable of processing versatile and complicated information. Conventional browsers are designed for a particular application or a particular type of consumers, i.e., conventional browsers are designed to fit a particular application. For example, if a browser is to be used to browse a web station, common browsers, for example, MOSAIC, NETSCAPE can be selected. If a browser is to be used to browse a particular data bank or a web station that provides a particular service such as VOD (video on demand) or internet shopping, the aforesaid common browsers and other browsers designed for browsing these data banks or web stations can be used.

Because conventional browsers are application-oriented, they have numerous drawbacks as outlined hereinafter:

1) The conventional browsers cannot automatically adjust the browser interface to fit personal differences. Because a regular browser is designed for a particular type of user or a particular application, the same browser interface is provided for different users. This design may overlook certain types of users, for example, children before school or aged users. In the application of remote shopping, male and female consumers may show differences in commodity selection priority. The conventional browsers cannot process these personal quality differences.

2) The conventional browsers cannot automatically adjust the browser interface subject to the user's operational habit. Every-browser user has a particular habit in operating a browser. For example, one user may search computer related products or another particular type of products at first when entering a remote shopping web page. Therefore, it is the best to show the user's favorites in priority. However, conventional browsers can only display the browser interface subject to a pre-set manner. They cannot adjust the appearance and function of the browser interface subject to different users.

3) In a regular web page, advertisements are simultaneously displayed. These advertisements are determined by the web station maintainer, i.e., everyone who enters the web page sees same advertisements. However, the effectiveness of an advertisement may vary with the consuming habit of the users. For example, a cosmetics advertisement may produce little effect to a male, and produce better effect to a female. Letting a web page advertisement be aimed at a suitable group of consumers can greatly improve the effectiveness of the advertisement, and simultaneously increase the using efficiency of the web page. However, because conventional browsers cannot recognize the type and consuming habit of the user, they cannot show different advertisement contents subject to different users.

SUMMARY OF THE INVENTION

The present invention has been accomplished under the circumstances in view. It is the main object of the present invention to provide a personalized interface browser and the related browsing method which automatically adjust outputted browser interface subject to the user's quality and operational habit, enabling the browser interface to fit the user's actual demand and to provide high quality service.

To achieve these and other objects of the present invention, there is provided a personalized interface browser for browsing information of a data bank, which comprises a browser display means for displaying a browser interface for enabling the user to browse the information of the data bank, a set of browser interface models corresponding to predetermined types of users for defining the appearance and function of the browser interface displayed on the display means, and a personal profile for recording the type of user corresponding to the user who currently uses the personalized interface browser, wherein when the current user starting the browser display means to display the browser interface, a corresponding browser interface model is picked up from the predetermined browser interface models subject to the personal profile of the current user, for adjusting the appearance and function of the browser interface.

The personal profile stores the user's personal data for use to select at least one corresponding browser interface model from the predetermined browser interface models for adjusting the appearance and function of said browser interface. The personal profile can store the personal operational habit of the user in operating the browser interface for use to select at least one corresponding browser interface model from the predetermined browser interface models for adjusting the appearance and function of said browser interface. The personal profile is stored in a personal profile bank, which is used to store personal profiles corresponding to all users.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

In the personalized interface browser and its browsing method, a personal profile is used corresponding to personal quality and temperament for recognizing every user's operational habit. The browser itself has pre-set browser interface models. After recognizing the current user's operational habit and personal quality by means of using the personal profile, a suitable browser interface can be selected from the pre-set browser interface models for the current user, i.e., the appearance and function of the browser interface to be displayed can be adjusted subject to the user's possible operational habit. In another word, a personalized browser interface is provided to fit the user.

Figure 1:
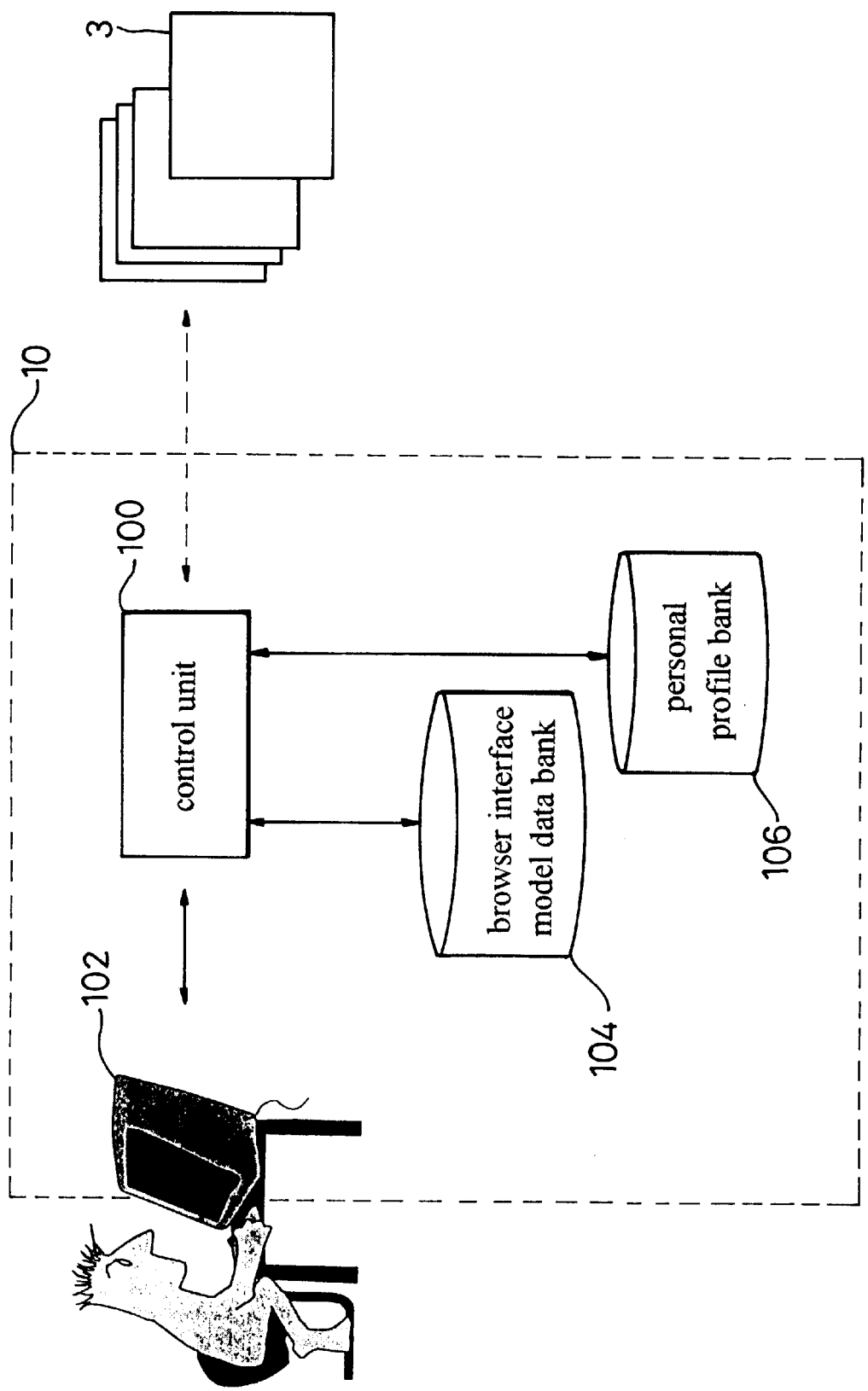
FIG. 1 is a system block diagram of the present invention.

Referring to FIG. 1, a personalized interface browser 10 is provided between the user 1 and the data bank or web station data 3. Through the personalized browser interface provided by the personalized interface browser 10, the user 1 can browse services and information provided by the data bank or web station data 3. The so-called data bank or web station data can be a particular server, for example, a BBS (bulletin board system), VOD (video on demand) server, or internet station providing particular functions. Information searching and fetching techniques can be achieved by conventional methods. The scope of the present invention is at the function of providing a browser interface.

In FIG. 1, the personalized interface browser 10 comprises four units, namely, the control unit 100, the monitor 102, the browser interface model data bank 104, and the personal profile bank 106. The monitor 102 is used to display a browser interface, enabling the user 1 to browse information provided by the data bank or web station data 3. The browser interface model data bank 104 has a number of browser interface models stored in it. These browser interface models correspond to a number of types of users, and are used to define the appearance and function of the browser interface. The personal profile bank 106 has personal profiles stored in it. Every personal profile has recorded in it the respective user's personal data such as sex, age, etc., and operational habit in operating the browser, for example, particular commercial article classifications selected in remote shopping. These personal data and operational habits correspond to a particular user model. Therefore, when a user starts the browser, the browser automatically picks up a browser interface corresponding to the user's personal data and operational habits stored in the corresponding personal profile, so as to synthesize the appearance and function of the actual browser interface.

The browser interface displaying procedure is explained hereinafter with reference to FIG. 1 again. The user 1 uses an input device (not shown), for example, a mouse or keyboard, to start the browser. When started, the control unit 100 recognizes the ID (identification) of the user 1, then finds out the corresponding personal profile from the personal profile data bank 106, and then determines the closest browser interface model subject to the data of the searched personal profile, and then finds out of the browser interface model from the browser interface model data bank 104, and then synthesizes and outputs the actual browser interface.

The browser interface model data bank 104 and the personal profile bank 106 are explained hereinafter.

Figure 2:
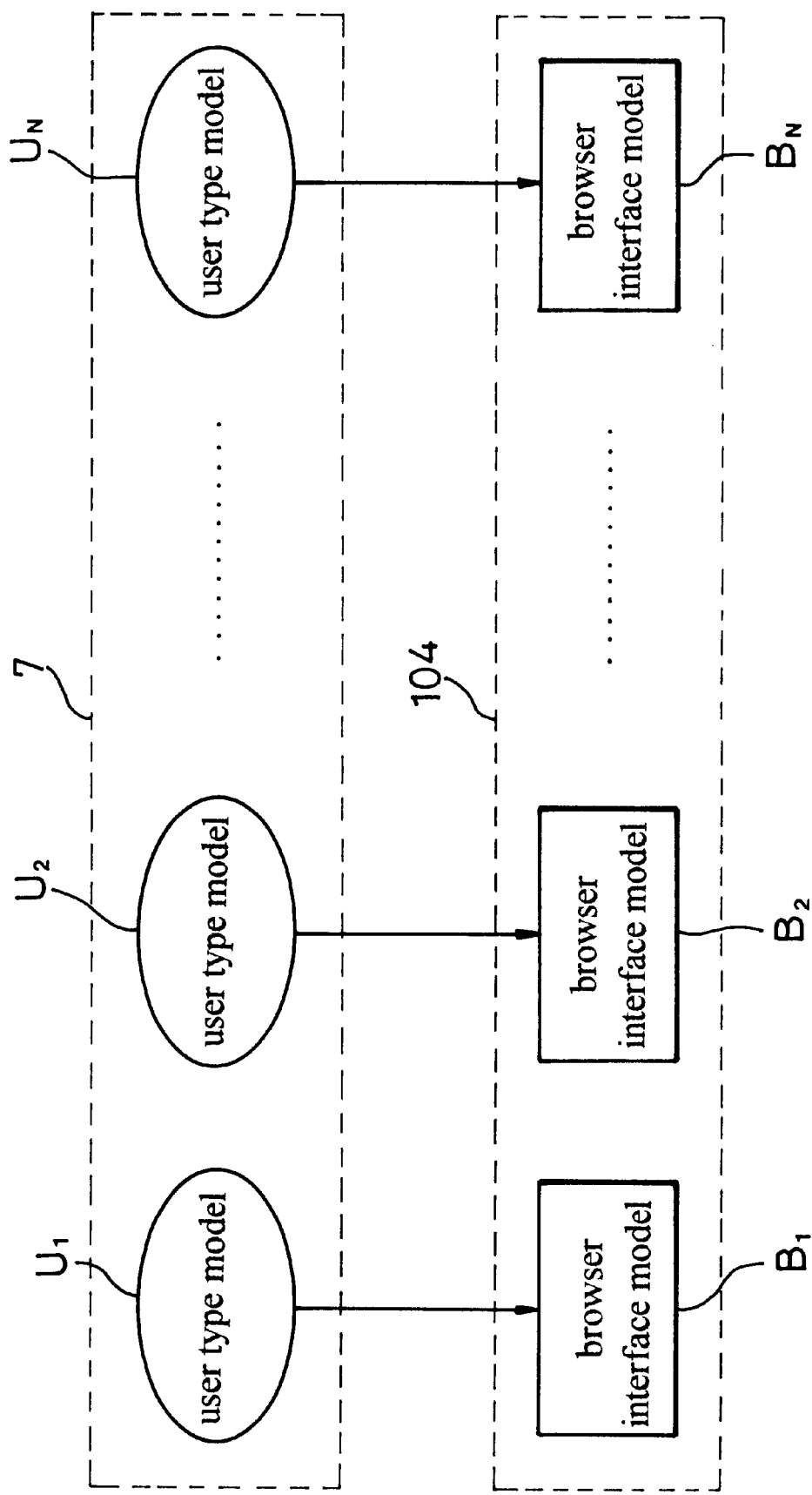
FIG. 2 is a schematic drawing explaining the concept of setting up browser interface models according to the present invention.

FIG. 2 is a schematic drawing explaining the concept of setting up browser interface models. As stated above, browser interface models are set up subject to predetermined types of users. In FIG. 2, the user type data bank 7 comprises a number of predetermined user type models $U_1 \sim U_n$, that describe the characteristics of the users. The user type models $U_1 \sim U_n$, correspond to the browser interface models $B_1 \sim B_n$ in the browser interface model data bank 104. According to the present invention, the user type models correspond to the browser interface models one to one. For example, in an application of VOD, the user type model $U_1$ is defined to be "male, age: within 20~29, favorites: particular type of motion pictures", and the corresponding browser interface model $B_1$ defines the browser interface subject to this user type model $U_1$, for example, to display in priority motion pictures suitable for this type of user for selection. Therefore, through the browser interface models set in the browser interface model data bank 104, the best browser interface is determined subject to different users.

Figure 3:
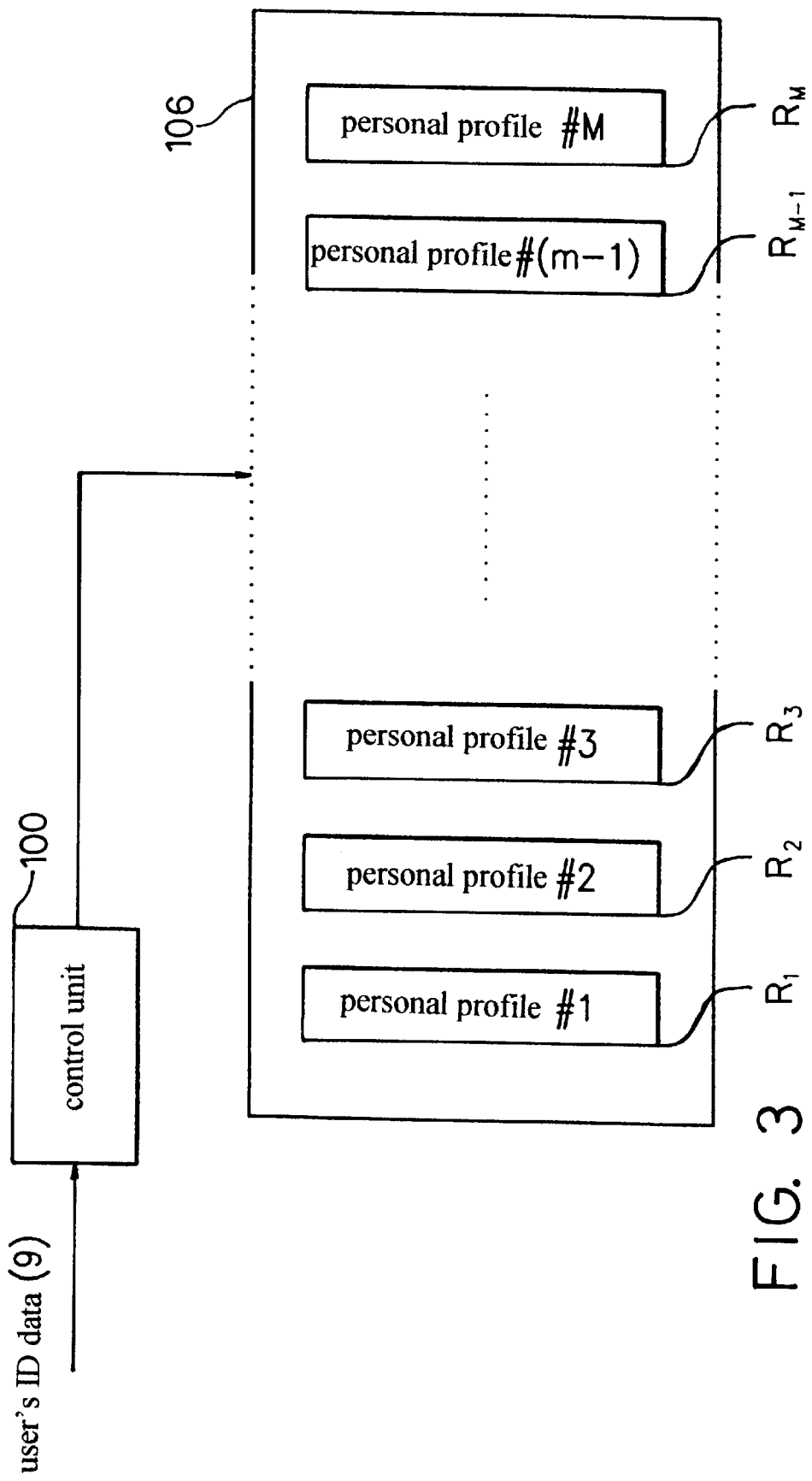
FIG. 3 is a schematic drawing explaining the access to the personal profile bank according to the present invention.

FIG. 3 is a schematic drawing explaining the access to the personal profile bank. As illustrated in FIG. 3, the personal profile bank 106 has stored therein personal profiles $R_1 \sim R_m$ of users #1~#M. Every personal profile has stored therein the respective user's personal data and operational habit. The type of the user is determined subject to the related personal data and operational habit. In order to know the identification of the current user, the user's ID data 9 must be provided to the control unit 100, enabling the control unit 100 to search the personal profile bank 106 for a corresponding personal profile subject to the user's ID data 9. Subject to the recorded data in the obtained personal profile, the control unit 100 can then fetch the corresponding browser interface. Because the data of the personal profile contains every record the user ever operated, the control unit 100 can adjust the best fit browser interface.

Figure 4:
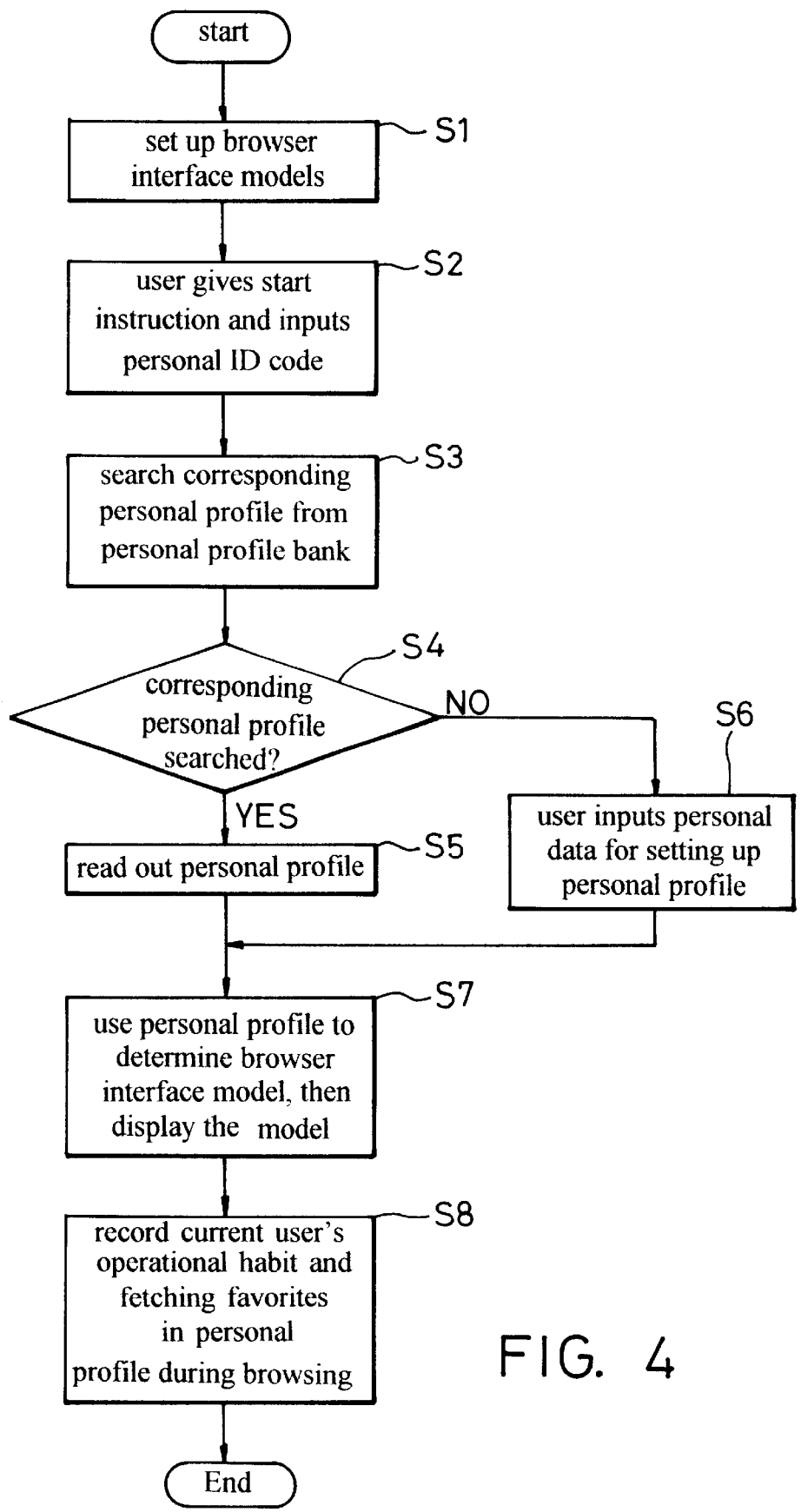
FIG. 4 is a flow chart explaining the browsing procedure.

The browsing procedure and the operation of the personalized interface browser are outlined hereinafter. FIG. 4 is a flow chart explaining the browsing procedure. When started, it proceeds to the step of setting up browser interface models in the browser (S1). These browser interface models have concern with the applied browsing content, and are used to define the best browser interface status for different types of users. When the user gives a start instruction after the setting of browser interface models, the control unit 100 becomes ready to start the browser interface, and to link to the desired data bank or web station (S2). At the beginning, the system requests the current user to input the user's name and ID code for recognition (S2). After receipt of the user's ID code, the control unit 100, as shown in FIG. 3, searches the personal profile bank 106 for a corresponding personal profile (S3). The current user may have never used this browser before. In this case, the system cannot obtain a corresponding personal profile from the personal profile bank 106. Therefore, when the system obtained a corresponding personal profile (S4), it can directly read out such a personal profile (S5). If the system cannot find a corresponding personal profile (S4), it means that the current user never used the browser before, and the current user is requested to input related personal data for setting up a personal profile (S6) (personal operational habit data not included at this time). Either by directly reading out a personal profile or setting up a personal profile, the control unit 100 can determine a corresponding browser interface model and display the browser interface subject to the provided data (S7). At this time, the browser interface shown at the monitor 102 is the best fit browser interface for the current user. During browsing, the current user's operational habits and favorites are recorded in the respective profile (S8). When the current user uses the browser next time, the control unit 100 can then automatically adjust the browser interface.

As indicated above, the personalized interface browser achieves the following effects:

1) It automatically adjusts the browser interface subject to the type of the user, for example, subject to the user's age or profession, so that the best browser interface status is provided for the user.

2) It uses personal operational habits obtained from a personal profile for adjusting the browser interface. By means of recording the user's operation procedure, the browser can select the best fit browser interface from predetermined browser interface models for the user.

3) By means of using the personal profile, it determines qualities of the current user. When displaying advertising information, the advertiser can determine the advertisement subject to consumers ' so as to achieve the best advertising effect.

4) Further, using personal profile can improve the function and applicability of current browsers. In addition to conventional browsing function, the personalized interface browser provides personalized services such as setting up new service items, programs, etc. Therefore, the quality of service is greatly improved.

It is to be understood that the drawings are designed for purposes of illustration only, and are not intended for use as a definition of the limits and scope of the invention disclosed.

What the invention claimed is:

1. A personalized interface browser system for browsing information in a data bank, comprising:
   a) a user control unit in communication with the data bank;
   b) a browser display device in communication with the control unit for displaying a browser interface enabling a user to browse the information in the data bank;
   c) a browser interface model data bank in communication with the user control unit and storing a plurality of browser interface models each defining appearance and functions of a browser interface displayed on the browser display device; and
   d) a personal profile data bank storing a plurality of personal profiles of users, the personal profiles including user's operational habits and user's characteristics, whereby the user control unit selects one of the plurality of browser interface models from the browser interface model data bank to be synthesized, and automatically adjusts the appearance, functions before displaying on the browser display device based on a comparison of a personal profile of a user with the plurality of personal profiles in the personal profile data bank.

2. The personalized interface browser of claim 1 wherein said personal profile data bank stores data relating to personal operational habits of a user operating said browser display device to select a corresponding browser interface model from said browser model data bank for personalizing appearance and function of said browser interface.

3. A method of providing a personalized interface browser for browsing information in a data bank, comprising the steps of:
   a) providing a user control unit in communication with the data bank;
   b) providing a browser display device for displaying a browser interface enabling a user to browse the information in the data bank;
   c) proving a browser interface model data bank in communication with the user control unit and storing a plurality of browser interface models in a browser interface model data bank, each defining appearance and functions of a browser interface displayed on the browser display device;
   d) storing a plurality of personal profiles of users in a personal profile data, the personal profiles including user's operational habits and user's characteristics, whereby the user control unit selects one of the plurality of browser interface models from the browser interface model data bank to be synthesized, and automatically adjusts the appearance, functions before displaying on the browser display device based on a comparison of a personal profile of a user with the plurality of personal profiles in the personal profile data bank.

4. The method of providing a personalized interface browser of claim 3 further comprising the step of recording a current user's personal data in the personal profile data bank for use in selecting a browser interface model for the current user.

5. method of providing a personalized interface browser of claim 3 further comprising the step of recording in the personal profile data bank operational habits of a current user in operating the browser display device for use in selecting a browser interface model for the current user.

* * * * *